Figure 5:
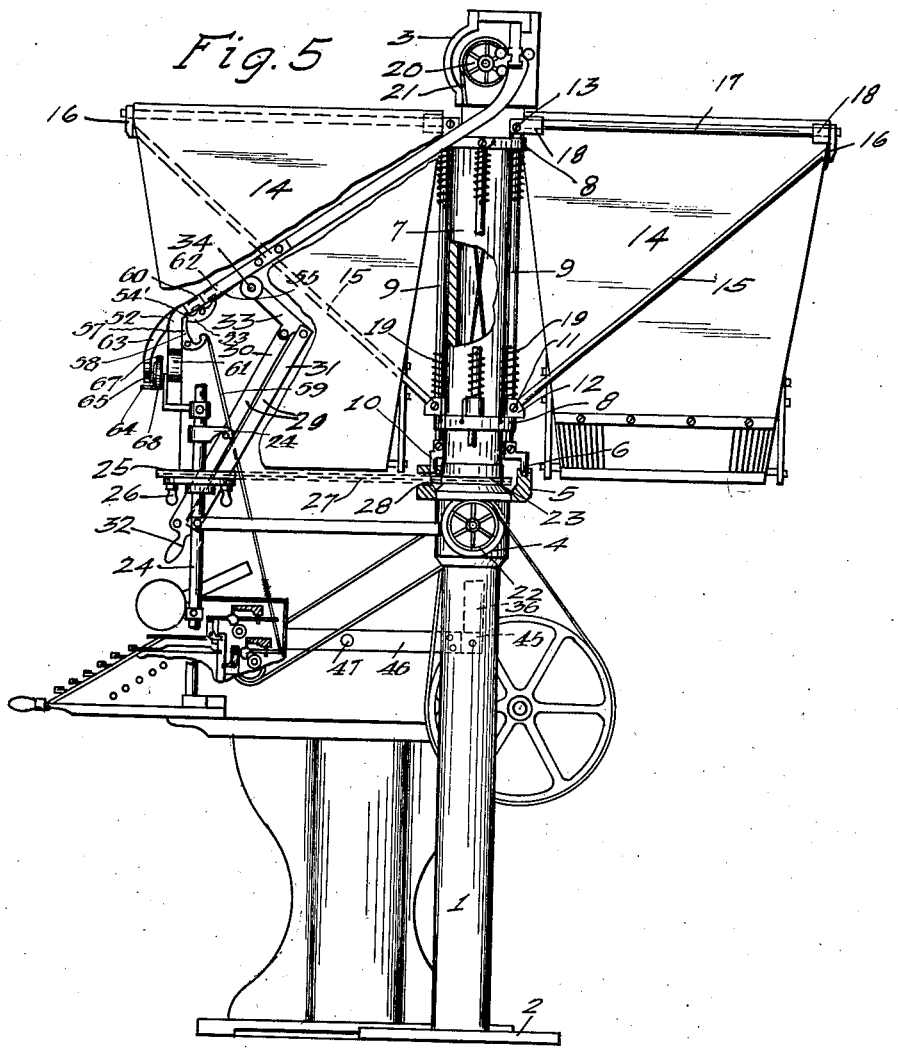

G. E. MARLATT.
LINOTYPE MACHINE.
APPLICATION FILED SEPT. 4, 1913.
1,200,861.
Patented Oct. 10, 1916.
9 SHEETS—SHEET 1.
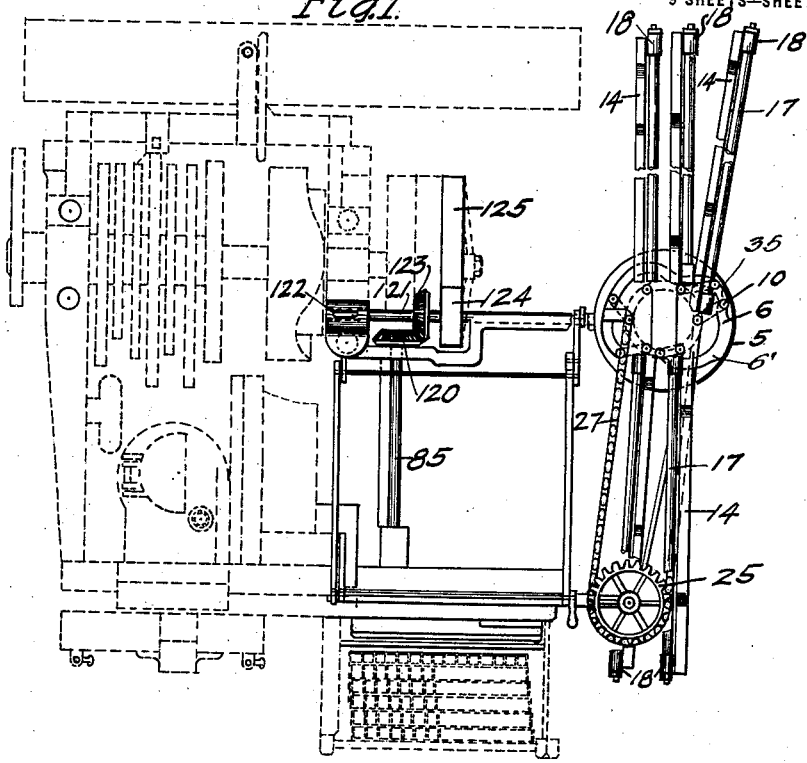
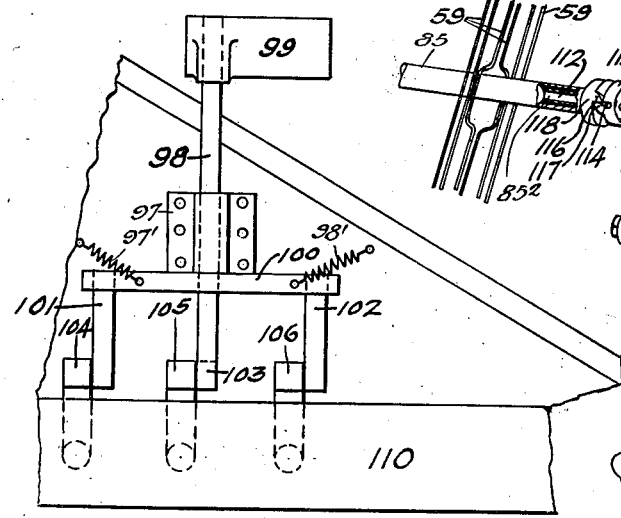
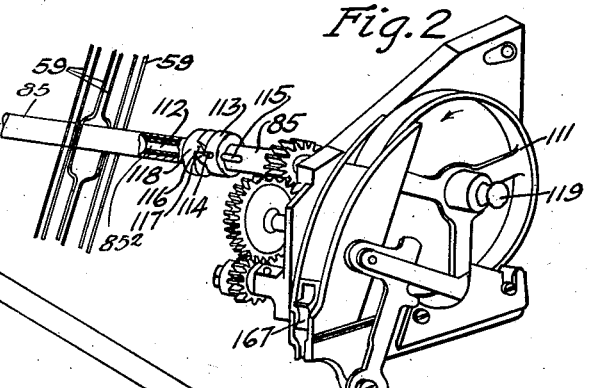
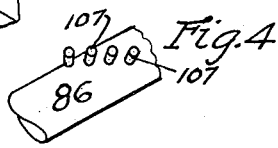
Witnesses:—
Anne Hartenstein
J. D. Haskin
Inventor:—
GEORGE E. MARLATT.
By Frith L. Mach
His Attorney.

G. E. MARLATT.
LINOTYPE MACHINE.
APPLICATION FILED SEPT. 4, 1913.

1,200,861.

Patented Oct. 10, 1916.
9 SHEETS—SHEET 2.

Witnesses,
James Scarr.
Anne Hartenstein

Inventor
GEORGE E. MARLATT
By
Robert L. Mach
Attorney.

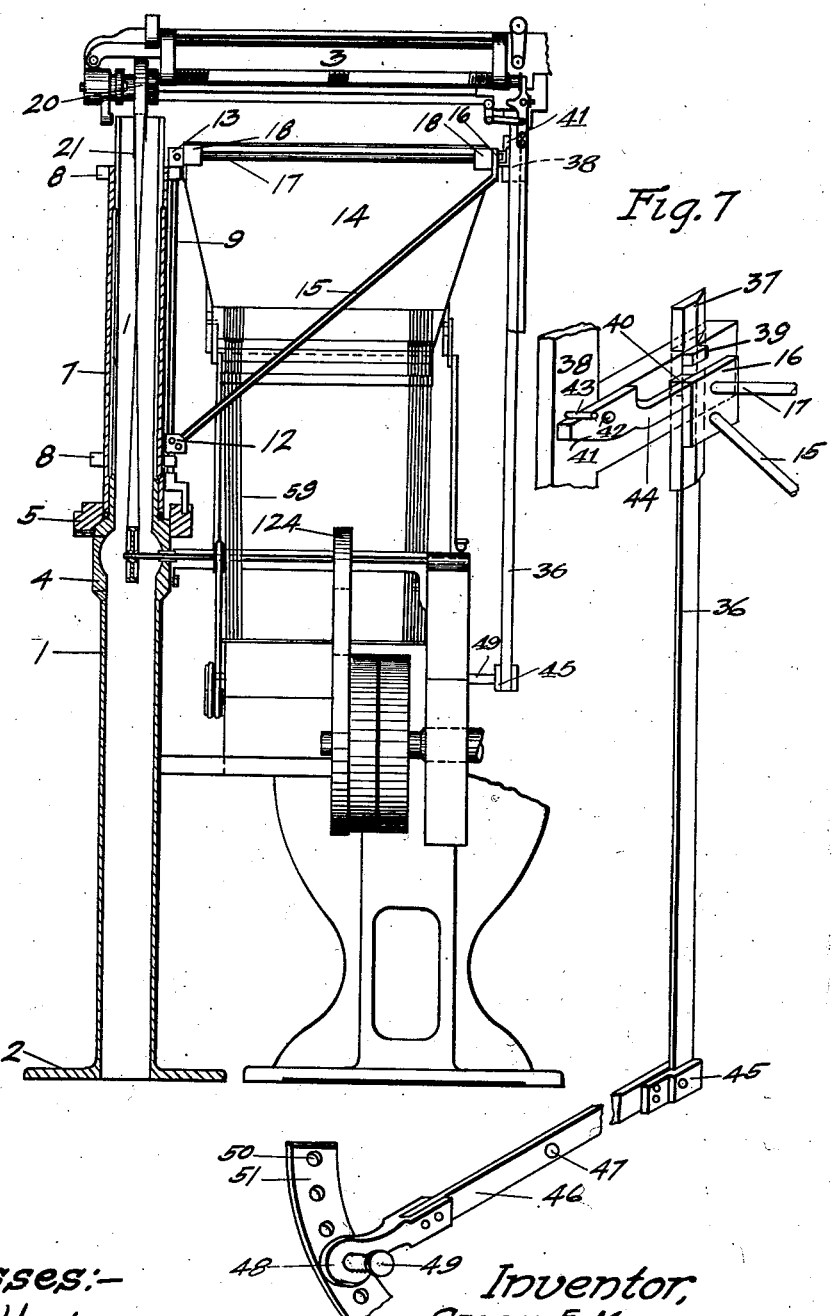

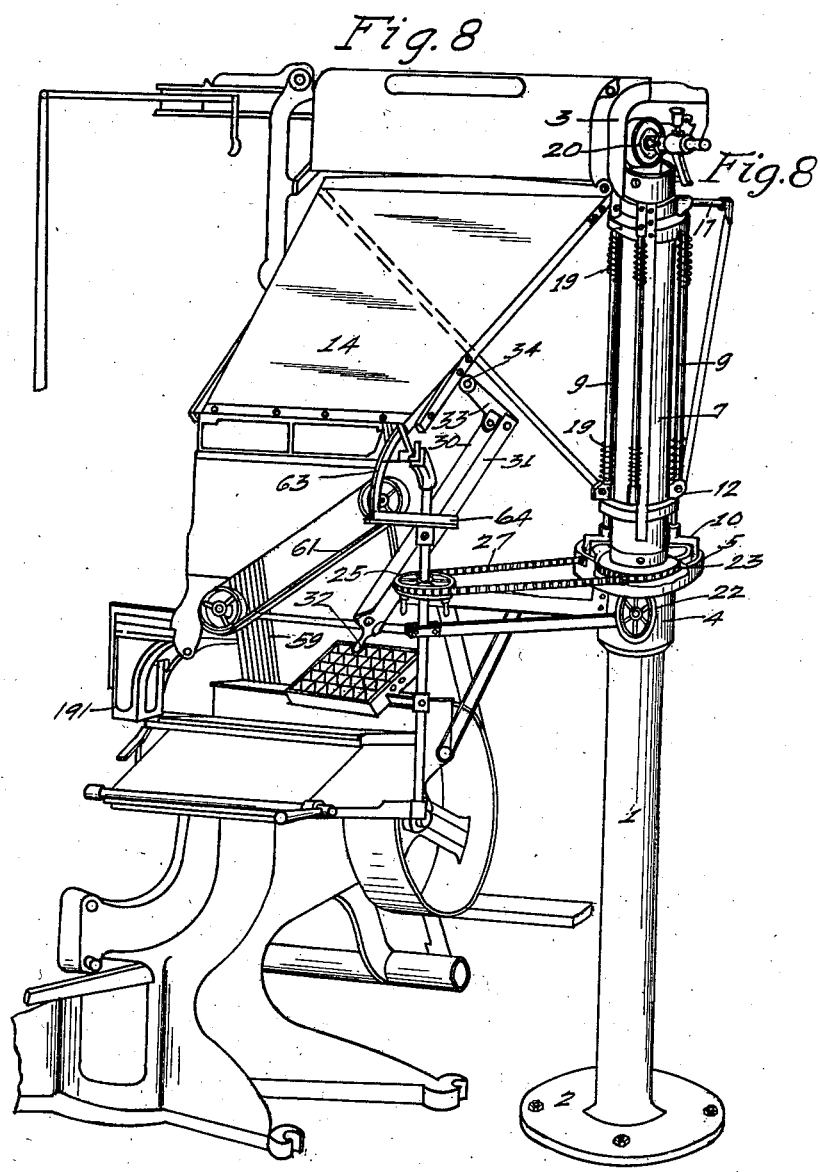

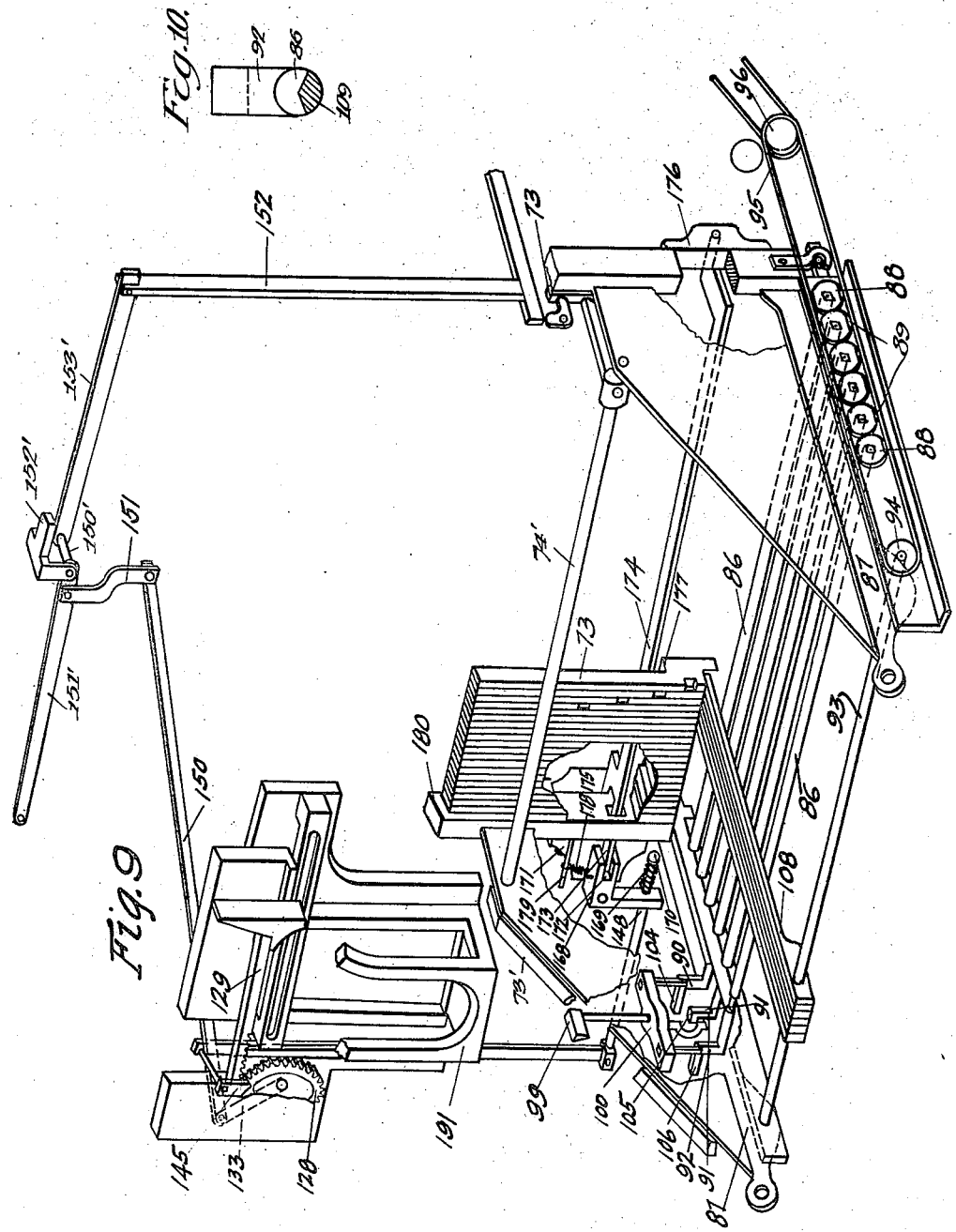

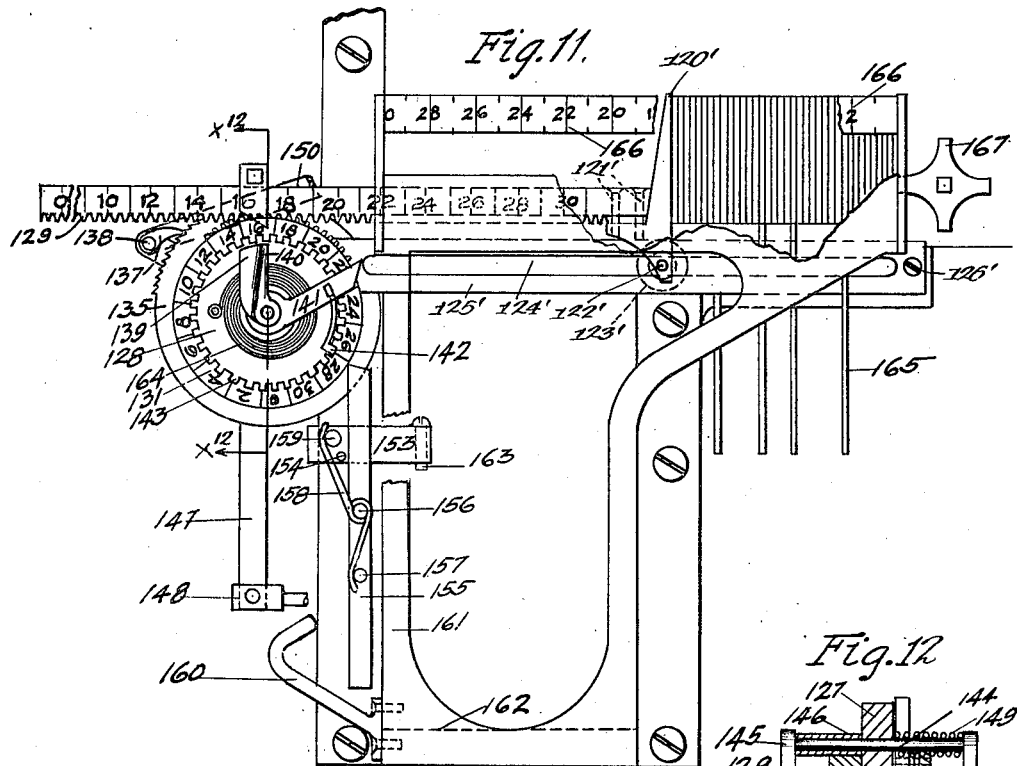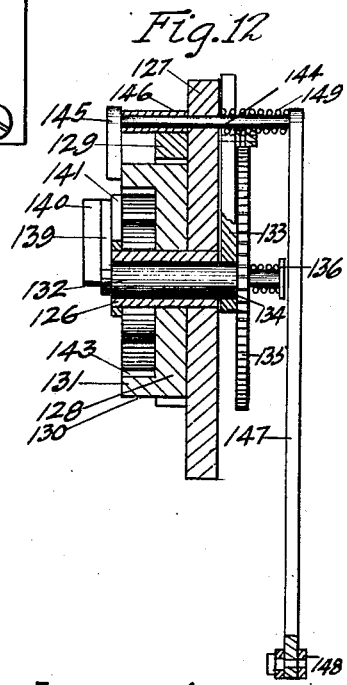

G. E. MARLATT.
LINOTYPE MACHINE.
APPLICATION FILED SEPT. 4, 1913.
1,200,861.
Patented Oct. 10, 1916.
9 SHEETS—SHEET 7.
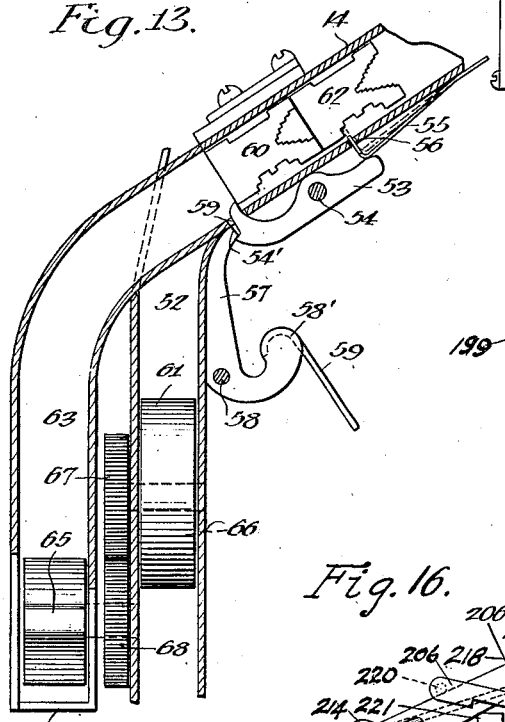
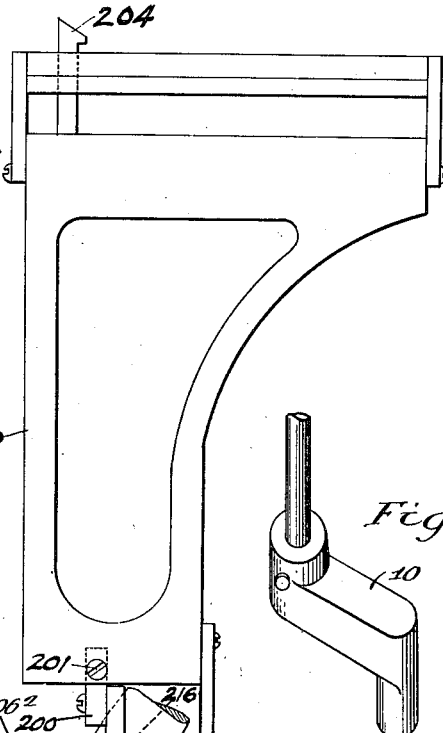
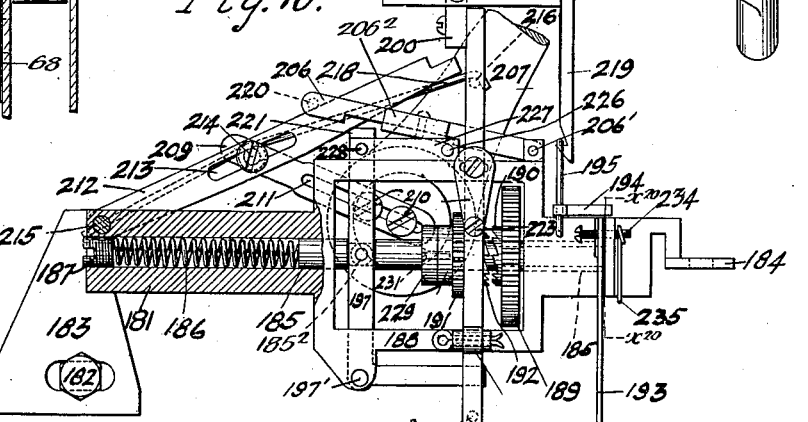
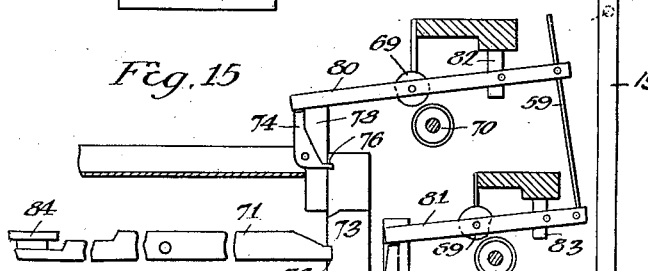
WITNESSES
Anne Hartenstein
J. D. Haskin
INVENTOR
GEORGE E. MARLATT
By [signature]
His Attorney.

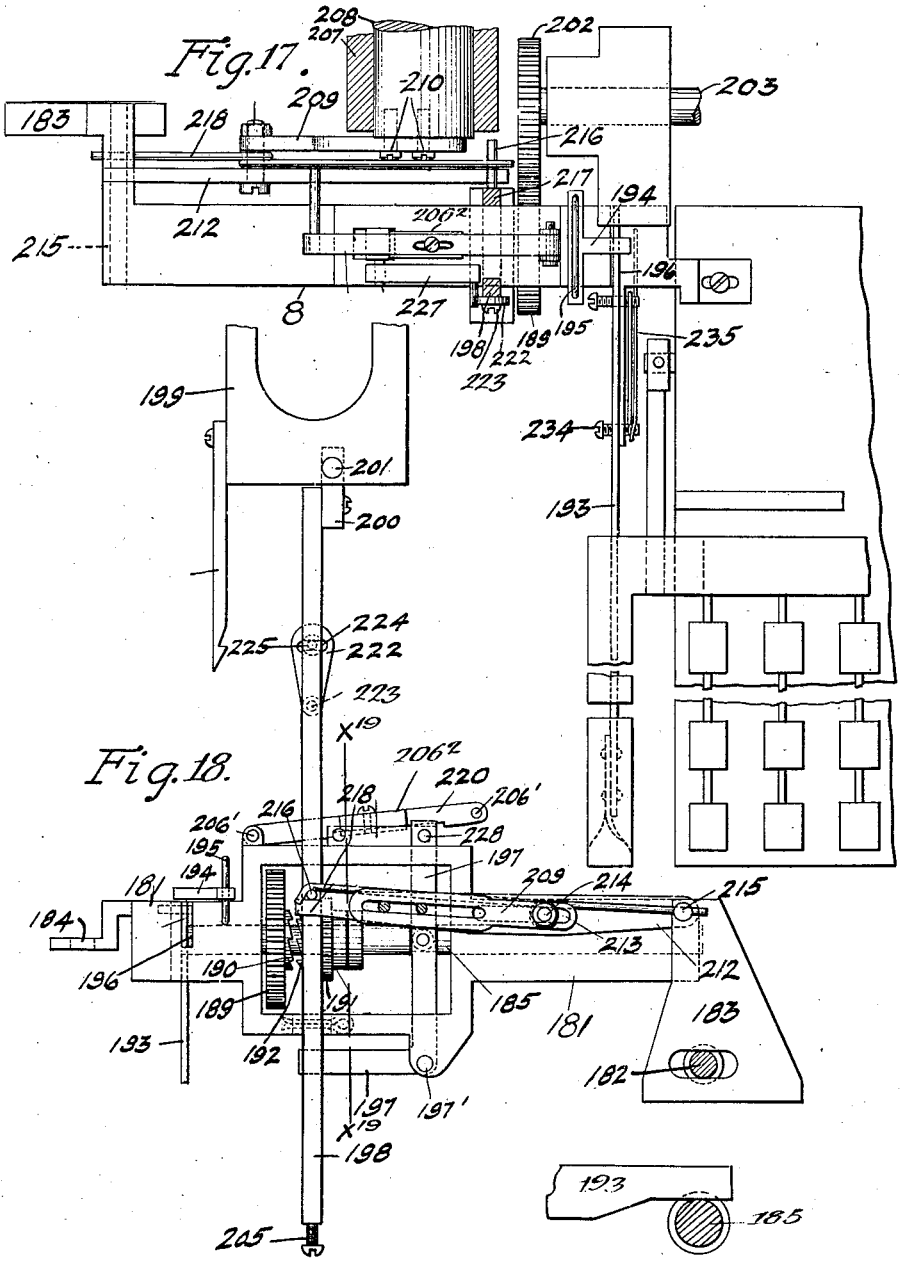

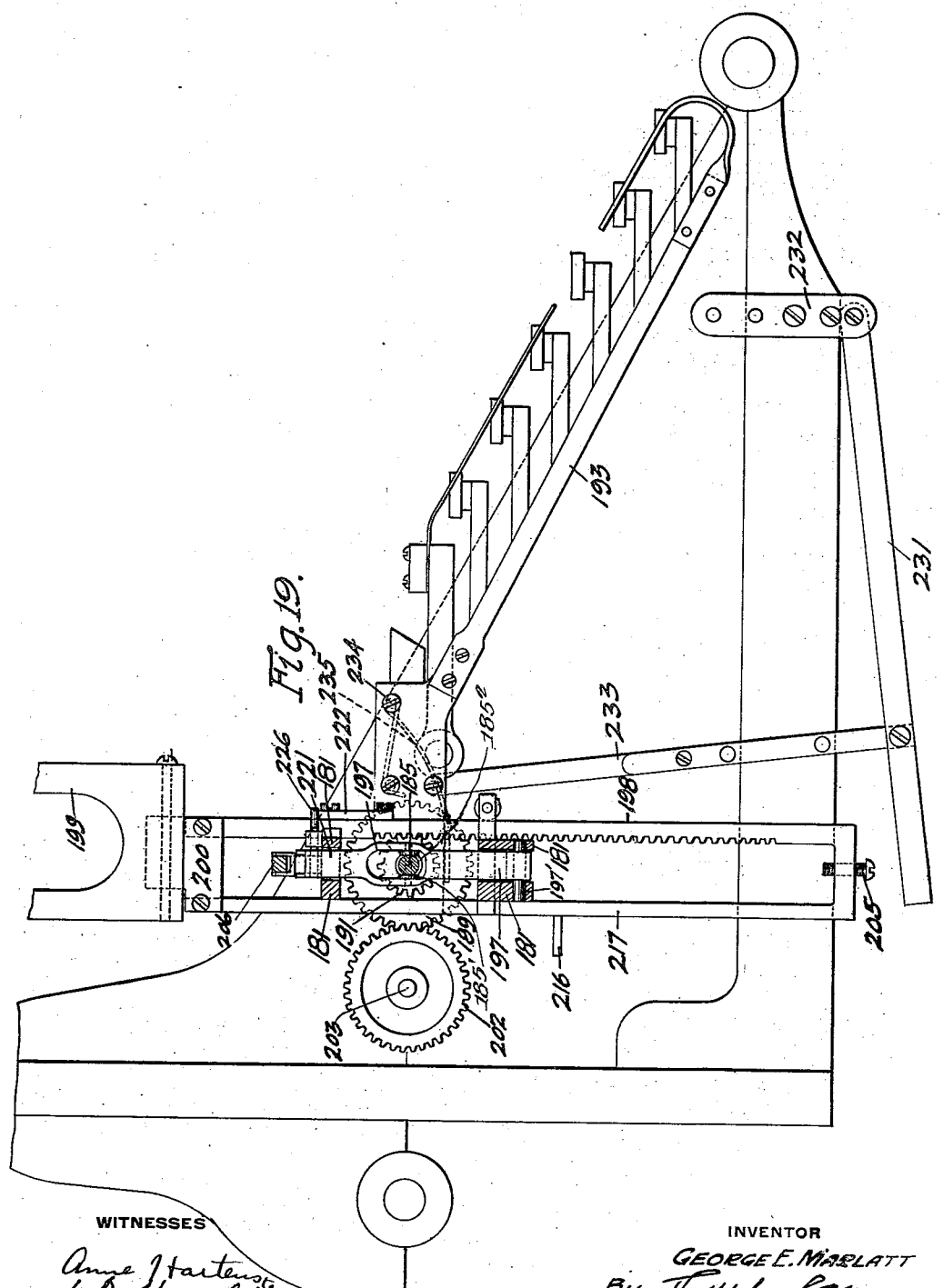

UNITED STATES PATENT OFFICE.

GEORGE E. MARLATT, OF PASADENA, CALIFORNIA.

LINOTYPE-MACHINE.

1,200,861.  Specification of Letters Patent.  Patented Oct. 10, 1916.

Application filed September 4, 1913. Serial No. 788,093.

*To all whom it may concern:*

Be it known that I, GEORGE E. MARLATT, a citizen of the United States, residing at Pasadena, in the county of Los Angeles and State of California, have invented a new and useful Improvement in Linotype-Machines, of which the following is a specification.

My invention relates to improvements in linotype machines, and the object of my invention is to provide an improved and simplified means whereby a plurality of matrix magazines may be attached to a machine, accessible to the conveying mechanism and one of said magazines may be operably connected thereto as desired, thus eliminating the necessity of multiple magazine mechanism as used on the common type of machines.

Another object is to provide a simplified means for assembling the matrices in a line, conveying them to the mold and universally lining them in the mold.

Other objects will appear in the subjoined detailed description.

I attain these objects by means of the mechanism illustrated in the accompanying drawings, in which—

Figure 1 is a plan of a linotype machine in dotted lines with my multiple magazine mechanism shown in full lines; Fig. 2 is a perspective of the assembler delivery mechanism; Fig. 3 is a fragmentary elevation of the end of the keyboard showing the word or prefix mechanism in place; Fig. 4 is a broken perspective of one of the word rods; Fig. 5 is an end elevation of a machine showing the multiple magazine rack in place; Fig. 6 is a sectional elevation from the rear of the machine and through the center of the magazine rack column; Fig. 7 is a perspective of the magazine lock mechanism; Fig. 8 is a perspective view of the machine; Fig. 9 is a perspective view of a portion of the keyboard mechanism and word key apparatus; Fig. 10 is a cross section of one of the special word key rods showing the weights therein; Fig. 11 is a front elevation of the matrix assembler; Fig. 12 is a sectional elevation of the same on the line $x^{12}$—$x^{12}$, Fig. 11; Fig. 13 is a sectional elevation of the lower end of the magazine, matrix delivery chute and sorts stacker chute; Fig. 14 is a perspective of the magazine carriage follower; Fig. 15 is a sectional elevation of the keyboard mechanism; Fig. 16 is a front elevation of the elevator lift mechanism; Fig. 17 is a plan of the same; Fig. 18 is a rear elevation of the same; Fig. 19 is a sectional elevation of the same on the line $x^{19}$—$x^{19}$, Fig. 18; Fig. 20 is a section on the line $x^{20}$—$x^{20}$, Fig. 16.

Similar reference numerals refer to the same parts throughout the several views of the drawings.

Only so much of a linotype machine is illustrated in the drawings as is necessary to properly illustrate the use of my improvements, and in many instances where the parts of my machine coincide with other types, the same are omitted.

I am fully aware of patents having been granted in numerous instances upon mechanisms for accomplishing some of the purposes herein enumerated, but I am not aware that anyone has heretofore patented or invented the specific means I herein disclose or the economical combination of operating parts included in my invention and which serve to simplify the operation of the machine, eliminate many unnecessary parts, reduce the possibility of trouble or congestion in the machine, render the operating parts more accessible, economize the time of the operator, and provide a means whereby any of the simpler types of machines may be rendered as valuable and economical as the more expensive and complicated types.

Reference is had to my invention of certain other improvements in this class of machine as described and claimed in an application filed Dec. 8, 1906, Serial No. 346,988, and to a prior patent dated Feb. 26, 1906, Patent No. 845,307.

In the types of machines now in use, where it is desired to use a plurality of fonts of type matrices of different style and character, the method of providing the same is to incorporate into the machine a multiple magazine mechanism in which a tier of magazines are placed one above the other on the machine, and the operating mechanism is so arranged that one style of type may be substituted for another, at the will of the operator. This mechanism is provided in the most expensive makes of machines only and involves certain changes in the operating mechanism, which from a consideration of economy and labor saving scarcely justify the additional expense, and as the multiple equipment can not be placed on the simpler types of machines, to change the style of type in one of these involves the complete removal of one magazine from the machine and the substitution of another. In my device therefore, I provide a means attachable to any size or style of machine whereby a plurality of magazines may be added to a machine and placed in accessible position whereby any one of the magazines at a time may be readily swung into and another removed from operative position by means of a single lever, adjacent to the keyboard and operable therefrom.

The hollow column 1 having the flange 2 for the purpose of securing the column to the floor, and which extends up to the top of the machine serves as a substitute for the supports heretofore provided for the distributer head 3 containing the distributer mechanism and has near its vertical center the sleeve 4 which has on its top edge the stationary cam 5, the removal of the supports heretofore used being necessary in order to permit the swinging of the magazines. This cam has formed in its top surface the irregular shaped slot 6, and on the outside of the column 1 and revolubly seated in the sleeve 4 and cam 5 is the barrel 7. Near the top of the barrel 7, and also near the bottom of the same and secured thereto are the collars 8, adapted to revolve therewith. Pivotally mounted in and between these collars are the vertical rods 9, the lower ends of which project below the lower collar and have secured thereto the followers 10 which are adapted to engage and run in the slot 6 of the cam.

Immediately above the lower of the collars 8 and secured to the rods 9 by the screws 11 are the brackets 12, and above the upper collar secured to the rods 9 in a similar manner are the brackets 13. The diagonal rods 15 are secured at the bottoms in the brackets 11 and at the top in the brackets 16, which have secured therein and are connected with the brackets 13 by the horizontal rods 17. The magazines 14 are provided at both sides on the bottom with the brackets 18 which are adapted to hinge on the rods 17. The vertical rods 9 are provided near each end with the coil springs 19, one end of said springs being secured to the rods and the other to the collars 8. The top of column 1 is secured to the distributer head 3 in which the distributer pulley 20 is revolubly mounted, this pulley being driven by the belt 21 which runs over the pulley 22 in and near the vertical center of the column. Both of these pulleys are similar to and perform the same functions as on the ordinary type of machines, but in my machine I inclose them in the column to prevent their interference with the other operating parts and for the purpose of simplifying the arrangement of the parts in the vicinity of the keyboard.

The barrel 7 is provided with the sprocket wheel 23 and on the frame 24 of the machine near the keyboard a similar sprocket 25 is revolubly mounted which has handles 26 depending therefrom, the sprocket chain 27 serving to operably connect the sprockets 23 and 25, and adapted to run through the opening 28 in the side of the cam 5.

The magazine lifting lever 29 is pivoted to the frame 24 of the machine and is composed of the two parallel bars 30 and 31, each of which is pivoted in the handle 32 at the front of the machine, and in the roller arm 33 at the other end, the connection of the bars 30 and 31 in the roller arm being eccentric. The roller arm 33 is provided at its outer end with the roller 34 adapted to engage the bottoms of the magazines 14. The bars 30 and 31 will repose in a horizontal position when a magazine is lowered from operative position, and the roller arm 33 will be parallel with them when in said position, the lever 29 and the roller arm 33 with the roller 34, serving to support the magazine when in operative position.

The magazine rack is adapted to receive any number of magazines up to and including six, and half of them will normally rest across the end of the machine, and the other half parallel thereto, the shape of the slot 6 in the cam 5 being such that in this position only will the followers 10 assume a position of rest and so hold the magazines stationary, as the tendency of the springs 19 is to restore them to a normal position, if they by any means become displaced. When in their normal position one of the followers 10 rests in a seat 35 in the wall of the slot 6 in the cam, so that an effort is necessary on the part of the operator, in order to release it. When thus released, an interruption 6' in the outer wall of the cam 5 permits the spring 19 to force the follower 10 across the interruption and causes the magazine 14 to swing into an opposite position to that when it is in engagement with the seat 35 in the rim of the cam 5.

When it is desired to displace a magazine from the machine and replace it with another, the lever 29 is lowered, and the magazine which rests thereon is lowered therewith and is allowed to swing down into a vertical position about the rod 17 at the top of the rack. This particular magazine carriage is swung around with the rack out of the way by means of the turning by the operator of the sprocket wheel 25, the followers at the bottom of the rack running in the slot 6 of the cam until its normal position has been reached, and simultaneously, with the movement of the displaced carriage, the desired magazine is swung around, is follower running in the slot 6 of the cam, until in position to be raised into operation with the machine, the lever 29 being forced against the bottom of the new magazine in an upward direction, until in the proper position, when the magazine may be secured in place, by means of a latch 24' mounted on the frame member 24.

As a means for locking the magazine rack in position after a magazine has been placed in operation in the machine, I provide the mechanism shown in Fig. 7, in which the vertical bar 36 has the chamfered top portion 37 adapted to dovetail into and slide in the frame 38 of the machine, and this bar has the lugs 39 on its front side adapted to engage the back of the lug 40 on the bracket 16 of the magazine carriage. The pawl 41 is pivoted at its front end to the frame 38 by means of the screw 42, and in the frame 38 above the front end of the pawl and adapted to rest against its top edge and limit its motion, is the pin 43. The lower edge of the pawl is tapered backwardly from the front end and the tail 44 is bent out from the frame 38 to permit the lug 39 on the bar 36 to pass between the frame and the bracket 16, as the pawl and the bracket are in the same plane, and the tail of the pawl is adapted to engage the front edge of the bracket 16, thus locking the bracket against a forward movement. As the lug 39 on the bar 36, as has been described, locks the bracket against a backward movement, the magazine to which the bracket is hingedly connected, is thus held rigidly in position in the machine.

The position of the lug 39 on the bar 36 corresponds to the position of the lug 40 on the bracket and the position of the lugs 40 on the brackets 16 varies with each magazine, the lug on one of them being a point lower down on the edge than shown in Fig. 7, and the next magazine in line will have a lug on its bracket still another point lower, etc., the difference of position of the lugs 39 on the bar 36 being equal to the difference of position of the lugs 40 on the brackets 16, and the lug 39 is adapted to engage a corresponding lug 40.

The magazine rack is adapted to revolve from right to left or anti-clockwise, and when a carriage is swung around into position the bracket 16 will pass beneath the pawl 41, raise the tail 44 up and when the lug 40 comes in contact with the lug 39, the pawl 41 will fall into place against the bracket 16. The lower end of the vertical bar 36 is pivoted between the bracket 45 and the horizontal lever 46 to which the bracket 45 is secured, and the lever 46 is pivoted near its center at the point 47 to a suitable portion of the frame of the machine, and the front end of the lever terminates in the handle 48 which is at the front of the machine convenient to the operator. The handle 48 is provided with a suitable stop pin 49 adapted to seat in the holes 50 in the segment 51 which is secured to a convenient part of the frame of the machine, accessible to the operator, there being one of the holes 50 for each of the magazines in the machine. For the convenience of the operator, the holes may be suitably numbered or otherwise designated to correspond with the magazines which they represent. When the pin 49 of the handle 48 is seated in one of the holes 50, it can be seen that the lug 39 on the bar 36 is thrown into position to engage the lug 40 on the bracket 16 of the particular magazine desired.

It should be understood that the magazines are never removed from the machine but merely moved from one position of operation to another of non-operation about the machine, and vice versa, and being permanently hinged to the carriage, they are at all times easily accessible and instantly placed into operation by means of the lever 29. For purpose of explanation, it may be stated that reference herein to a rack includes the entire magazine holding mechanism, and reference to a carriage includes only the suspension mechanism for each individual magazine.

When a magazine has been placed into operative position in the machine the matrices in the magazine are adapted to be dropped through the chute to the delivery mechanism hereinafter described, for purpose of assembling into lines, and to accomplish this result I provide the matrix escapement mechanism, which consists of the verge pawl 53, pivoted near its center on the rod 54. This rod extends entirely across the magazine and there are as many of the pawls 53 as there are channels in the magazine with the exception of the sorts channel. The forward point of the pawls 53 project through the bottom of the chute 52 at a point immediately adjacent to the lower end of the magazine 14, and the forward ends of the pawls are provided with the shoulder 54'. The tails of the pawls are adapted to engage the forward end of the comb spring 55 which is bent at right angles and adapted to project through the slot 56 in the bottom of the magazine.

The bell crank lever 57 is pivotally mounted on the rod 58 which also extends entirely across the magazine, there being one of these levers for each channel in the magazine except for the sorts channel. This rod is attached to the back side of the chute 52 and the upper ends of the bell crank levers 57 are adapted to engage the shoulder 54' of the pawls 53, and the lower ends are provided with the grooved arm 58' adapted to receive the ends of the key rods 59 which are bent around in the groove. When a key is depressed on the key board, the key rod 59 is pulled down and the bell crank lever 57 is caused to swing on its pivot 58 and its upper end moves outwardly from the chute 52, which by means of its contact with the shoulder 54' of the pawl causes the latter to swing on its pivot 54, the forward end emerging from the slot 59 in the back of the chute 52 and thus allowing the forward matrix 60 to drop out of the magazine 14 into the chute 52 and on to the conveying belt 61, while the rear end of the pawl swinging in the opposite direction forces the end of the spring 55 through the slot 56 until it projects into the magazine a sufficient distance to obstruct the path of the matrices, and thus serves to stop and hold the following matrix 62. The forward end of the pawl 53 and the end of the comb spring 55 serve to regulate the passage of the matrices from the magazine to the chute, and operate in and out of the slots 56 and 59 alternately, so that when the pawl releases the forward matrix, the spring 55 will stop and hold the one following. When the key on the keyboard has been released and the pawl restored to its normal position across the path of the matrices, the comb spring 55 will release the second matrix 62 and allow it to drop into position against the end of the pawl in readiness for another operation. When a magazine is lowered from operative position, as hereinbefore described, the radius described by the lower end of the magazine is such that the key rods 59 will not interfere with the forward end of the pawl 53, this pawl 53 and the combination pawl and spring 55 serving to retain the matrices in the magazine in the same manner, when the magazine is in or out of operative position.

In a machine of this character it is frequently necessary to insert matrices having characters which are not provided for in the magazine, and which the magazine will not accommodate, and to meet this emergency I provide a secondary chute 63 at the side of the magazine and attached to the main frame of the machine, the upper end of which is in contact with the last channel at the right of the magazine as shown in Fig. 13, and the lower end of which as shown in Fig. 13, is secured to the tray 64 which is adapted to be secured to the frame of the machine, so that the star wheel 65 which is operably connected to the pulley 66 of the delivery mechanism by means of the pinion 67 and the gear 68, is positioned in the tray 64 and on the side of the chute 63 next to the machine, the purpose of the star wheel being, as in the case of other types of machines, to move the matrices on the tray one point forward each revolution, and thus make room for the next matrix.

The object of the particular arrangement of the sorts channel and stacker hereinbefore described, in so far as it differs from the usual arrangement is to place all of the parts thereof out of interference with the movement of the magazines in or out of operative position, and also to provide a better passage of the matrices from the distributer bar to the stacker than is possible in the usual method of connecting the pi chute to the magazine pi channel midway between the two ends thereof.

The key board mechanism is composed of the usual form of parts, see Fig. 15, but I place the cams 69 and the rollers 70 one above the other instead of in a horizontally opposite position as is the usual case. The key bars 71 are adapted to seat in the notch 72 in the front edge of the key weights 73, and the pawls 74 and 75 also seat in similar notches 76 and 77 in the weights, but on opposite edges, and are pivoted to the cross bars 78 and 79, respectively. The upper end of the pawls 74 and 75 are adapted to engage the under edge of the cam bars 80 and 81 respectively, the bar 80 being pivoted to the cross bar 82, and the bar 81 to the cross bar 83. The rear ends of the cam bars 80 and 81 are secured to the key rods 59, and the connection between the keys 84 and the verge pawls 53 of the matrix delivery mechanism thus established the key rods 59 having a downward pull. The cams 69 are pivoted in the bars 80 and 81 and are adapted to engage the rollers and operate in the usual manner. Two of the key rods 59, nearest to the assembler delivery shaft 85 are deflected, in opposite directions, to permit of the passage of the shaft therebetween, as shown in Fig. 2.

In Figs. 3 and 9 is shown a mechanism for prefix or word composition consisting of the rods 86 journaled in the sides 87 of the key board frame. One end of these rods may be provided with the pulleys 88 having the flattened segments 89, and the other end provided with the cranks 90, 91 or 92. The rod 93 is also secured in the sides 87 of the frame, and on one end is revolubly mounted the belt pulley 94 connected, and operated by the belt 95, with the similar pulley 96 suitably and conveniently mounted on the frame of the machine. This belt engages the concentric portion of the pulleys 88 on the rods 86, and operates them as hereinafter described. To the keyboard frame above the crank end of the rods 86, the bracket 97 is secured, as shown in Fig. 3, and in this bracket is slidably and revolubly seated the key stem 98 having on its top the triangular key 99 and secured thereto. Secured to the stem 98 below the bracket 97 is the bar 100 in which are secured the depending legs 101 and 102 at each end, the stem 98 extending below the bar 100 so that its bottom 103 is approximately in line with the bottom of the legs 101 and 102.

The cranks 90, 91 and 92 have the outwardly projecting arms 104, 105 and 106 respectively, the leg 101 being adapted to engage the forward side of the arm 104; the leg 102 adapted to engage the forward side of the arm 106, and the bottom 103 of the stem 98 adapted to engage the forward side of the arm 105. The bottom 103 of the stem 98 is bent to form a recess to permit the arm 105 which is shorter than the other arms of the cranks to pass through when it moves forward. The positions of the cranks and legs as above mentioned is normal, and the rods 86 are thus prevented from rotation by the friction of the belt 95 on the other end of the rods 86.

The key 99 is adapted to move in three directions, and by each of these movements a different word or prefix may be composed, the designation of the three words being printed on the top and two sides of the key. The rods 86 are adapted to move the whole of a revolution at each operation, and these rods are provided with the pins 107, as shown in Fig. 4, around their circumference, each of the pins 107 representing one letter of a word or prefix, as for instance in the suffix "tain," the first pin would represent "t," the second "a," the third "i" and the fourth "n," and if it is desired to compose this suffix, the key, for instance, may be pressed down, thus sliding in the bracket 97 on the frame, the lower end of the key stem 103 will disengage the arm 105 of a crank 91 and a weight 109 formed in the rod 86 as shown in Fig. 10 will pull the rod 86 partially around until the belt 95 engages the concentric portion of the pulleys, when the revolution will be completed. When the rod 86 turns, the pins 107 rapidly and successively operate the key bars 108, and the matrices in the magazine for the suffix "tain" will be dropped by a single operation of the keys 99 into the assembling line. By turning the key 99 to the right, the arm 104 is released and another word may be similarly composed, and likewise by turning the key to the left, the arm 106 will be released and still another word composed. It will be seen that one key thus serves to operate three of the rods 86 and each of the rods serves to compose one word or prefix. Any number of the rods and keys may be used in sets as described which can be conveniently mounted on the keyboard of the machine, thus providing any desired number of words. The restoration of the key is accomplished by means of two springs 97' and 98', one end of each spring being secured to the bar 110 on opposite sides of the key stem 98, and the other ends to the key board frame.

The assembler delivery pulley 11 which drives the pulley 66 in the chute 52 beneath the magazine 14 by means of a belt 61 is fixed to the hollow shaft 85' which is journaled in the frame of the machine above the keyboard, and in line with this shaft is the driving shaft 85 which is also hollow on its inner end. A smaller hollow shaft $85^2$ having a knob 119 on its outer end adjacent to the pulley 111 is slidable in the shaft 85' and also in the hollowed end of the shaft 85, the inner end of the shaft 85' having a slot 115 through which a pin 114 in a clutch member 113 passes, the inner end of the pin being secured to the inner shaft $85^2$ so that the clutch member 113 may revolve therewith. A clutch member 118 similar to the one 113 is secured on the end of the driving shaft 85 and is provided with a jaw 116 adapted to engage a similar jaw 117 on the clutch member 113 when the members are in the position shown in Fig. 2 and motion to the shaft 85' and the pulley 111 is imparted thereby. Should it be desired to disengage the clutch members, this may be accomplished by pulling the knob 119 outwardly from the pulley 111 when the motion of the latter will be stopped. The assembler drive shaft 85 has on its other end the bevel gear 120, Fig. 1, and the intermediate shaft 121 which is journaled in the bracket 122 secured to the frame of the machine above the main drive shaft and on the other end of which shaft is fixed the pulley 22, has the bevel gear 123 adapted to mesh with the gear 120. On this shaft is also provided the pulley 124 which is driven by the belt 125 to a drive pulley on the main drive shaft of the machine.

The line assembling mechanism, in order to provide additional space for a copy holder and the sorts tray 64, above the keyboard is placed to the left of the elevator. The assembler finger 120' is secured to the assembler slide 129 by the screws 121', the finger is provided with a pin 122' terminating in a flange 123', the pin 122' or a roller mounted thereon is adapted to ride in a slot 124' formed in a guiding and supporting member 125' contained within the elevator and secured to the frame of the machine by screws as at 126', and the flange 123' serves to retain the finger 120' in its position with relation to the guide 125'. The hollow sleeve 126 is fixed in the frame 127 and on it is revolubly mounted the gear 128 on the front side of the frame. This gear is adapted to mesh with the rack 129 in the assembler carriage and has the hub 130 which is countersunk on the inside, the face 131 having a scale marked on it to correspond with the scale on the rack 129. Revoluble in the sleeve 126 is the shaft 132 having loosely mounted on its rear end and behind the frame the pawl lever 133, the extreme rear end being reduced and provided with the shoulder 134. The ratchet wheel 135 is loosely mounted on the reduced end of the shaft 132 and adapted to bear against the shoulder 134 and is held against this shoulder by the coil spring 136, the spring being designed to create sufficient friction between the ratchet 135 and the shoulder 134 to cause the shaft 132 to revolve with the ratchet but not hold it rigidly in rotation therewith.

The pawl lever 133 is provided at its upper end with the pawl 137 and is pivoted thereto by the pin 138, the pawl being adapted to engage the teeth in the ratchet wheel 135. On the front end of the shaft 132 the pointer 139 is secured and this pointer has the rib 140. Loosely mounted on the sleeve 126 is the pointer 141 which has secured to it the spring pawl 142 adapted to engage the notches 143 on the inside of the hub 130 corresponding in number and position to the scale on the face of the gear.

The shaft 144 is pivotally mounted in the frame 127 above the rack 129 and has secured to its front end the pointer 145, which depends from the shaft 144, and is separated from the frame by the sleeve 146, the pointer being adapted to designate the marks of the scale on the gear 128. To the rear end of this shaft is secured the vertical lever 147 which is pivoted in the end of the lever 148 at its bottom. The coil spring 149 is interposed on the shaft between the frame and the lever 147, the spring serving to hold the lever in position away from the frame, but permitting the pointer 145 to be drawn away from the gear in case of congestion of the line of matrices in the assembler, so that the pointer 141 may be drawn around in an anti-clockwise direction between the pointer 145 and the gear 128, and permit a matrix to be withdrawn from the line. The pawl lever 133 is pivotally connected to the horizontal lever 150 by the pin 138 and the lever 150 is pivotally connected with the lower end of the space band key lever 151, which is pivoted at its upper end to a lever 151' fixed to a pin 150' in the bracket 152', the space band key rod 152, as shown in Fig. 9, being pivoted to a lever 153' which is also fixed to the pin 150'.

Below the gear 128 and pivoted to the elevator frame is the short horizontal lever 153 pivoted at 159, which is provided with the limit pin 154 adapted to engage the edge of the vertical lever 155 pivoted to the frame near its center by the pin 156, the upper end of the lever 155 being adapted to engage the hub 130 of the gear and the lower end having the pin 157. The pin 156 carries the spring 158, one end of which rests against the pin 157 and the other against the pivot pin 159, thus holding the brake lever 155 against the hub 130 of the gear. The outwardly projecting bracket 160 is secured to the bottom of the elevator 161, and when the elevator rises, is adapted to engage and restore the pointer 139 by contact with the rib 140, and when the floor 162 of the elevator comes in contact with the adjusting screw 163 in the end of the lever 153 it will be lifted and the pin 154 will contact with the side of the brake lever 155 and cause the friction of the brake to be released from the hub 130 of the gear, when the entire assembler mechanism will be restored to a normal position and in readiness to start a new line. This restoration is accomplished by means of the coil spring 164 which is secured at one end to the gear 128 and at the other to sleeve 126, and which is placed in tension by the rotation of the gear.

The numerals on the scale of the gear and of the rack represent "ems" and the length of the desired line may be established by setting the pointer 141 at the proper numeral on the scale of the gear 128 which revolves in an anti-clockwise direction and carries the pointer 141 around with it until it comes in contact with the pointer 145, when the rack which has moved the same distance as the gear will be stopped. The pawl 137 advances the ratchet 135 in a clockwise direction, the position of the pointer 139 registering the maximum expansion of the space bands 165 in the line after delivery to casting position, and when the nearest edges of the two pointers 139 and 141 are in the same plane, their position indicates to the operator that the line is sufficiently full of matrices and space bands and ready to be cast, although composition of the line may continue until the pointer 141 is in contact with the pointer 145. In the drawings the scale 166, the star wheel, matrices, and space bands 165 are shown for purpose of illustration only, and do not represent a novelty of idea.

The lever 148 is loosely seated in the bell crank 168 and is provided with the spring 169 on its inner end adapted to force the lever 148 normally outward by means of its tension between the vertical arm of the bell crank and the head 170. The bell crank is pivoted to the bracket 171 and its upper arm is provided with the slot 172 in which is loosely seated an arm 173 of the key weight locking bar 174. When in composing a line in the assembler the pointer 145 comes in contact with the pointer 141, the pointer 145 swings on its pivot and the vertical lever pivoted at the same point swings outwardly, pulls the horizontal lever 148 with it, compresses the spring 169, moves the upper arm of the bell crank 168 down, and thus sets the key weight locking bar 174 which is pivoted in the brackets 175 and 176 on the frame of the machine and locks them against the top of the shoulder 177 on the key weights 73. The spring 178 is hooked on the pin 179 in the frame 180 and suitably secured to the upper arm of the bell crank lever 168 and serves to restore the latter when the locking bar 174 is released after the assembler mechanism is restored.

The mechanism for lifting the elevator is shown in Figs. 16, 17, 18, 19 and 20, and is mounted upon the bracket 181 adapted to be secured to the frame of the machine by the bolt 182 through the foot 183 and a similar bolt through the foot 184. In this bracket is journaled the shaft 185, one end of which shaft engages the end of the coil spring 186 in the bearing and held in place by the plug 187. The bracket has the yoke 188 in the center, and loosely seated on a shaft 185 near one side of the yoke is the gear 189 on the hub of which is the clutch member 190. Fixed to the shaft 185 is the pinion 191 having a similar clutch member 192 adapted to engage the other clutch member. When the key stem 193 is depressed by the operator the horizontal stem 194 which is secured to the latch 195 is raised by the trigger end 196 of the key stem 193, leaving the elevator free to ascend. At the same time the trigger end of the key stem which holds the shaft 185 in tension against the spring 186 and the clutch members in a separated position, being raised permits the shaft 185 to slide to the right in its bearing by means of the tension of the spring 186 and carry with it the pinion 191, the clutch member 192 and the vertical arm 197 of the bell crank lever 197 which spans the shaft 185 and has the projections 185' adapted to engage the annular groove 185². This action thus throws the two clutch members into engagement, and the pinion engages the rack 198 which is secured to the elevator 199 by the piece 200 and the screw 201. The gear 189 revolves continuously, motion being communicated to it by the gear 202 on the shaft 203 on the frame of the machine, and when the clutch members have thus engaged, the pinion 191 revolves and raises the rack 198, and the elevator 199. When the elevator has reached the limit of its upward travel, the latch 204 on the elevator prevents its return, in the usual manner, until the proper time. At the instant that the upward limit is reached, the adjusting screw 205 in the horizontal portion of the rack 198 strikes the horizontal arm 197 of the bell crank, and the trigger end 196 of the key stem 193 which has been held up by resting on the shaft 185, is dropped behind the end of the shaft and the clutch members separated, and is so held by the latch 206 which drops over the end of the vertical arm of the bell crank 197, the latch remaining in this position until the line delivery lever 207 on the shaft 208, traveling to the left, has returned to its normal position, all of this action taking place before the elevator starts to descend. The line delivery lever 207 and its connections are released by the ascending elevator striking a latch, not shown, at the top of the elevator shaft, and operate to carry the line of matrices out of the assembling elevator to the left and into the line delivery channel and toward casting position.

As the line of matrices passes out of the elevator, the latch 204 is struck by a lug traveling with the line delivery carriage, and the elevator is thus rendered free to descend. Before this occurs, however, the line delivery shaft 208 has rotated slightly carrying with it the arm 209 which is secured to it by the screws 210 in the elongated slot 211, and the lever 212 having the slot 213 in which is pivoted the outer end of the arm 209 by means of the screw 214, the free end of the lever 212 traveling outward and downward in its radius around its pivotal point 215 in the bracket 181 to a position under a pin 216 in a rod 217 depending from the elevator back of the rack 198. Pivoted at one end on the screw 214 is the spring 218, and the other end, when the arm 212 moves downward, rests against the pin 216, and when the elevator has been released the spring forces it down until the pin 216 rests or rides upon the end of the lever 212, as shown in Fig. 17. The lever 212 continues to swing downward and inward until the end is released from the pin 216 just before the elevator reaches the bottom of the elevator shaft, and the spring 218 forces the elevator down the remaining distance where it is latched by means of the hook 219 engaging the latch 195, as shown in Fig. 16. The line delivery lever 207 then returns to the right raising the spring 218 and the lever 212 which engages the pin 220 in the latch 206 and raises it, thus leaving all of the parts in normal position.

An adjusting block 206² on the latch 206 is so adjusted as to drop back of the upper end 221 of the bell crank lever when the elevator has been latched in its uppermost position and the line delivery lever 207 has started to the left the adjusting block holding the clutch in its separated position even though the distance between the clutch members is not sufficient to allow the key stem trigger 196 to drop back of the end of the shaft 185. In the event that the key stem trigger has not dropped the clutch members are further separated by means of the adjustable link 222 pivoted to the rack 198 by the screw 223 at one end and having the radial slot 224 at the other end engaged by the pin 225 in the rack 198'. This link 222 is adapted to engage the pin 226 in a link 227 pivoted to the bell crank lever 197 by the pin 228, and thus force the lever 197 back sufficiently to allow the key stem trigger to drop into place at the end of the shaft 185. In the event that the key stem is depressed before the return of the line delivery carriage to its normal position the latch 206 will prevent the clutch from becoming operative until such return.

The pinion 191 is secured to the shaft 185 by means of the bushing 229 which is split into halves and keyed on the shaft, the bushing being secured to the hub 230 of the pinion by the screws 231. A particular feature of this device is the knee attachment, consisting of the horizontal lever 231' pivoted at the front end to the bracket 232 on the frame, and pivotally connected at the other end to a vertical lever 233 which is pivoted to the key stem 193 back of its pivotal point 234. When the key stem is depressed by hand it is caused to swing on its pivot 234 against the tension of the spring 235, and the knee lever 233 being connected to the key stem back of its pivotal point will raise the back end of the stem up, and thus operate the lifting mechanism in the same manner as the hand operated lever, and economize in the time of the operator. Certain features of my device were described and claimed in a patent issued to me by the United States, dated Feb. 26, 1907, Patent No. 845,307, and reference is had thereto, in connection with this application.

What I claim as my invention and desire Letters Patent for is:—

1. In a linotype machine, the combination with a matrix delivery mechanism, of a magazine rack adapted to hold a plurality of magazines vertically and revolubly in the machine; and a supporting member therefor common to all of said magazines, forming a part of the frame of said machine and in such relation thereto that one of said magazines may be in operative and the others in inoperative position in the machine.

2. In a linotype machine, the combination with a matrix delivery mechanism and a frame, of a vertically disposed columnar support forming a part of said frame, connected with and adapted to form a support for the distributer head; a magazine rack revolubly and resiliently mounted on said support; a plurality of magazines pivoted horizontally on said rack; and means whereby one of said magazines may be operably and the others inoperably connected with said machine.

3. In a linotype machine, the combination with a matrix delivery mechanism, of a magazine rack adapted to hold a plurality of matrix magazines vertically and revolubly in the machine; a common supporting member therefor; and means whereby one of said magazines in operative connection with the machine may be disconnected therefrom and another substituted therefor; and a lever adjacent to the keyboard for actuating said means.

4. In a linotype machine, the combination with a matrix delivery mechanism of a magazine rack forming a part of the frame of the machine and having a vertical supporting column to which the distributer head is secured and adapted to revolubly and vertically hold a plurality of matrix magazines; means whereby one of said magazines may be displaced from operative position and another placed into operative position in the machine; and a lever adjacent to the keyboard for actuating said means.

5. In a linotype machine, the combination with a matrix delivery and assembling mechanism, of a magazine rack forming a part of the frame of the machine and having a vertical supporting column to which the distributer head is secured and adapted to revolubly and vertically hold a plurality of matrix magazines; and means whereby any one of said magazines may be revolved on said column and swung into operative position in the machine so that the matrices will drop from said magazine to said delivery mechanism by the operation of the keys on the keyboard.

6. In a linotype machine, the combination of a matrix delivery mechanism; a magazine rack adapted to vertically and revolubly hold a plurality of matrix magazines; a supporting column therefor forming a part of the frame; means whereby one of said magazines may be revolved on said column and placed in operative position and the other of said magazines in non-operative position in the machine; means for retaining the non-operative magazines in a stationary position when not in use; and means controllable from the keyboard of the machine whereby the operative magazine may be displaced and another substituted therefor.

7. In a linotype machine, the combination with a matrix delivery and assembling mechanism, of a magazine rack forming a part of the frame of the machine and adapted to hold a plurality of magazines vertically and revolubly thereon and in such position relative thereto that one of said magazines at a time may be revolved on said rack and instantly placed into operative position; and a lever adjacent to the keyboard for placing said magazines.

8. In a linotype machine, the combination with a matrix delivery and assembling mechanism, of means for holding a plurality of matrix magazines in said machine comprising a column vertically disposed in and forming a support for the distributer head of said machine, and means for revolubly securing said magazines to said column in such a manner that any one of said magazines may be instantly placed into operative relation with said delivery mechanism.

9. In a linotype machine, the combination with a matrix delivery and assembling mechanism, of means for holding a plurality of matrix magazines in said machine, comprising a vertical column secured to and forming a support for the distributer head of said machine, means for revolubly mounting said magazines on said column, and means whereby one of said magazines, after having been revolved on said column and placed in alinement with said delivery mechanism may be swung vertically into operative relation thereto.

10. In a linotype machine, the combination with a matrix delivery and assembling mechanism, of means for holding a plurality of matrix magazines in said machine, comprising a vertical column secured to and forming a support for the distributer head of said machine, means whereby one of said magazines, may be revolved on said column and placed in alinement with said delivery mechanism, and means for swinging said magazine vertically into operative relation with said delivery mechanism, when it is so alined.

11. In a linotype machine, the combination with a matrix delivery and assembling mechanism, of means for holding a plurality of matrix magazines in said machine, comprising a vertical column secured to and forming a support for the distributer head of said machine, means whereby one of said magazines may be revolved on said column and placed in alinement with said delivery mechanism, and a lever pivoted to the frame of the machine adapted to engage the bottom of said magazine when it is so alined and cause said magazine to be placed into operative relation with said delivery mechanism, when operated from the keyboard.

12. In a linotype machine, the combination with a matrix delivery and assembling mechanism, of means for holding a plurality of matrix magazines, comprising a vertical column secured to and forming a support for the distributer head of said machine, a rack revolubly mounted on said column having means for horizontally pivoting said magazines, means for revolving said magazines on said column, and means for placing one of said magazines into operative relation with said delivery mechanism and holding the balance of said magazines out of operative relation thereto and in non-interference with said machine.

13. In a linotype machine, the combination with a matrix delivery and assembling mechanism, of a vertical column secured to and forming a support for the distributer head of said machine; an irregular slotted cam secured to said column; a rack revolubly mounted on said column having arms adapted to engage and travel in the slot of said cam and having a plurality of outwardly extending arms; a matrix magazine pivotally mounted on each of said arms; and means whereby one of said magazines at a time may be placed into operative relation with said delivery mechanism by revolving said rack on said column and swinging said magazine upwardly into registration with said delivery mechanism.

14. In a linotype machine the combination with a matrix delivery and assembling mechanism, of a vertical column secured to and forming a support for the distributer head of said machine; an irregular slotted cam secured to said column; a rack revolubly mounted on said column adapted to resiliently hold a plurality of magazines comprising a pair of collars, a plurality of vertical rods secured to said collars, springs secured to and on said rods and adapted to engage said collars, crank arms on the lower ends of said rods adapted to engage the slot in said cam, horizontal rods secured to the upper ends of and extending outwardly from said rods, and brace rods connecting the outer ends of said horizontal rods and the lower ends of said vertical rods; a matrix magazine pivoted on each of said horizontal rods; a lever pivoted to the frame of the machine adjacent to the keyboard; a handle on the outer end of said lever; and a roller on the inner end of said lever adapted to engage and raise one of said magazines into operative position in the machine when said handle is depressed and lower said magazine when said handle is raised.

15. In a linotype machine, the combination with a keyboard mechanism, of a matrix delivery mechanism comprisng a magazine having a plurality of channels in which the matrices are contained and adapted to slide; a comb spring secured to the floor of said magazine having an upwardly bent tooth adapted to project into each of said channels across the path of the matrices; pawls pivoted beneath and to the floor of said magazine in line with each of said channels, the rear ends of which are adapted to engage and bear upon said comb spring and the front ends being adapted to extend through slots in the chute adjacent to the front of the magazine and normally across the path of the matrices for holding them in place; shoulders on the front ends of said pawls; bell crank levers pivoted to the walls of the delivery chute having upwardly extending arms adapted to engage said shoulders for forcing them out of said slots and outwardly projecting arms at their lower extremities; key rods secured at their upper ends to said outwardly projecting arms and connected at their lower ends with the keys on the keyboard; and a delivery chute through which said matrices may be conveyed from the magazine to the assembling mechanism.

16. In a linotype machine, the combination with a matrix delivery and assembling mechanism, of a keyboard mechanism comprising a plurality of key bars, keys on said bars, keyweights having notches in their forward edges adapted to be engaged by the inner ends of said bars, a cross bar at the top of the weights attached to the frame of the machine, pawls pivoted on said cross bar opposite said weights whose lower ends are adapted to engage notches in the front side of said weights, a similar cross bar below said other cross bar, keyweights alternating with said other weights having notches in their rear edges, similar pawls pivoted to said latter cross bar whose lower arms are adapted to engage the notches in the backs of said latter weights, a pair of cross bars one above the other back of said weights having bars secured thereto and depending therefrom, a cam arm pivoted to the bars on said latter bars each having a cam revolubly mounted near their center, adapted to engage rollers thereunder, and their forward ends being adapted to engage the tops of said upper and lower sets of pawls, respectively, and key rods secured to the upper and lower cam arms for operatively connecting them with the matrix delivery mechanism.

17. In a linotype machine, the combination with a keyboard, of means for composing a plurality of words, one at a time, by a single movement of a key for each word, said means comprising a plurality of key bars pivoted at the front of the keyboard, equal in number to and in engagement with the keyweights, and means co-acting therewith for successively and rapidly actuating the key bars representing the letters of the word composed.

18. In a linotype machine, the combination with a keyboard mechanism, of a special word key adapted to operate in three different directions; and means actuated by said key whereby a whole word may be composed by each of the several movements of said key.

19. In a linotype machine, the combination with a keyboard mechanism, of a key for composing whole words; means whereby said key may be caused to compose several words by a different movement for each word; and means whereby the movements of said key may be made both pivotal and vertical.

20. In a linotype machine, the combination of a keyboard; a depressible and pivotal key thereon for composing a different word by each depression and pivotal movement in one or the other direction; means on the keyboard for successively actuating the respective key weights representing the letters of the word to be composed; and means for operatively connecting said key with said actuating means.

21. In a linotype machine, the combination of a keyboard; a depressible and pivotal key thereon for composing a different word by each depression and pivotal movement in one or the other direction; and a key rod actuating mechanism operably connected with said key and consisting of a plurality of revoluble rods longitudinally disposed beneath the keyboard a plurality of pins secured in the peripheries of said rods and a plurality of key bars above and at right angles to said rods and in engagement with the keyweights, for causing the successive operation of each of said weights represented by the letters of the word to be composed when said key is moved in either direction.

22. In a linotype machine, the combination with a keyboard mechanism, of a mechanism for composing whole words and prefixes at a single operation of the key and comprising rods journaled in the ends of the keyboard frame, pulleys on one end of said rods having a flattened segment, a rod secured to said frame, key bars pivoted on said rod, a pulley on the end of said rod, a belt for operably connecting all of said pulleys with a suitable driving pulley, cranks on the other ends of said revoluble rods having outwardly projecting arms of different lengths, a key stem slidably and pivotally mounted at one end of the keyboard, a bar secured to said key stem, a key on the top of the stem the lower end of the stem being adapted to engage the forward side of the crank having the shortest arm and hold it against forward movement, legs secured to the bar on said stem depending therefrom and adapted to engage the arms of said other cranks and hold them against forward movement, a plurality of pins in the periphery of said revoluble rods, one for each letter in the word represented thereby, means whereby the depression of said stem and the turning thereof in one or the other direction will cause said rods to be released, one of said rods for each of said directions, and the rapid and successive release of the matrices from the magazine for a particular word when said pins engage the lower edge of said key bars.

23. In a linotype machine, the combination with a matrix delivery mechanism and elevator, of an assembler indicating mechanism comprising a sleeve secured to the frame of the machine at the left of the elevator, an assembler slide, a rack secured thereto, a gear loosely mounted on said sleeve meshing with said rack a recessed hub on said gear having notches on its inner periphery, a scale on the forward side of said gear corresponding to the scale on said rack, a shaft revoluble in said sleeve, a pointer on the forward end of said shaft, a pointer revoluble on said sleeve having a spring actuated pawl secured thereto in engagement with the notches on said hub, a spring in the recess of said hub and secured at one end thereto and to said sleeve at the other end, ratchet means on said shaft, a pawl lever on said shaft, a pawl on said lever for engaging and advancing said ratchet, a space band key lever, means for connecting said pawl lever with said space band key lever for registering the expansion of the space bands on the scale on said gear, brake means on the frame of the machine in engagement with said hub; and means for restoring said assembling and indicating mechanism when the line in the carriage is full and the elevator rises.

24. In a linotype machine, the combination with a matrix assembling mechanism, of a gear revolubly mounted on the frame of the machine at the left of the assembler carriage, a rack on said carriage adapted to mesh with and be supported by said gear; a disk integral with said gear; and brake means adapted to engage the periphery of said disk for the purpose described.

25. In a linotype machine, the combination with a matrix delivery mechanism, an assembler slide, a space band mechanism and a plurality of key weights, of means for assembling and indicating the line of matrices in the slide comprising a revoluble scale for indicating the length of the line, revoluble means for indicating the expansion of the space bands in the line, means for connecting said keyweights therewith and means co-acting therewith for locking said keyweights against further operation after a line is completed until the restoration of said assembling mechanism.

26. In a linotype machine, the combination with a matrix delivery mechanism, an elevator, an assembler slide, a rack thereon, a scale on said rack and a space band mechanism, of means for assembling and indicating the line of matrices comprising a circular and revoluble scale corresponding with the scale on said rack for indicating the length of the line, revoluble means for indicating the expansion of the space bands in the line, means on said elevator adapted to engage and restore said indicating means and means co-acting therewith for locking the keyweights in the machine against operation after the completion of a line.

27. In a linotype machine, the combination with a magazine rack, of means for locking one magazine into operative position in the magazine, comprising a pawl secured to the frame of the machine, a limit pin in the frame above the forward end of the pawl and the rear end thereof being adapted to engage a bracket on the magazine, a lug on the side of said bracket next to the frame, a bar vertically slidable in the frame and having a lug adapted to engage the back of the lug on said bracket, and means adjacent to the keyboard of the machine, whereby the pawl and the lugs may be disengaged and the magazine thus unlocked, at the will of the operator.

28. In a linotype machine, the combination with a magazine rack, of means for locking a plurality of magazines contained in said rack into operative position in the machine, one at a time and comprising a pawl pivoted to the frame of the machine whose back end is adapted to engage and hold said magazines against forward movement, brackets on said magazines; lugs on said brackets; a bar vertically slidable in said frame and having a lug on the front thereof adapted to engage a corresponding lug on the magazine bracket, the positions of the lugs on said brackets being different, according to the position of its corresponding lug on the bar, and said lugs adapted to lock the magazine against a backward movement in the rack, and means for selectively operating and controlling said lock from the keyboard, as described.

29. In a linotype machine, the combination with a line assembling mechanism, of a matrix delivery mechanism comprising a shaft operably connected with the main drive shaft of the machine, and adapted to pass between a pair of the key rods of the machine, a clutch member secured to said shaft, a shaft journaled in the frame of the machine above the keyboard and adapted to revolve in and with said shaft; a delivery pulley on the outer end of said shaft and secured thereto, a clutch member on said outer shaft, loosely mounted and having a pin slidable therein and adapted to engage a slot in the outer shaft, said latter clutch member being secured to said inner shaft and adapted to engage said other clutch member, and means on the outside of the pulley at the end of its shaft whereby said clutch members may be engaged to cause the revolution of the inner shaft with the outer shaft, as described.

30. In a linotype machine, the combination with a matrix escapement mechanism, and a magazine, of an escapement actuating mechanism comprising a plurality of keyboard cam yokes pivoted centrally between the ends thereof; and a key rod secured to one end of each of said yokes and adapted to move downwardly for the releasing of the matrices in said magazine.

31. In a linotype machine, the combination with a matrix distributing and delivery mechanism, of a plurality of magazines supported in the machine, movable horizontally about a common axis for the selection of a desired magazine for use, each of the magazines being independently and pivotally supported in a horizontal and vertical plane and movable into and out of operative position by raising and lowering, respectively, the lower end thereof.

GEORGE E. MARLATT.

Witnesses:
ANNE HARTENSTEIN,
J. D. HASKIN.